Sept. 23, 1958  F. ERDÉLYI  2,852,806
MEANS FOR MANUFACTURING SUBSTANTIALLY SLEEVE
SHAPED ARTICLES CLOSED AT ONE END AND
PROVIDED WITH AN INTERNAL THREAD
Filed Oct. 28, 1953
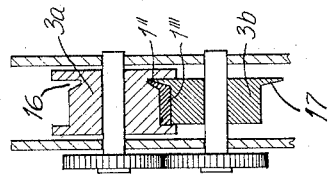
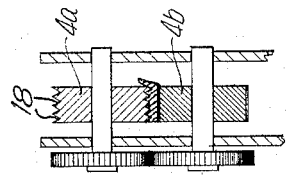
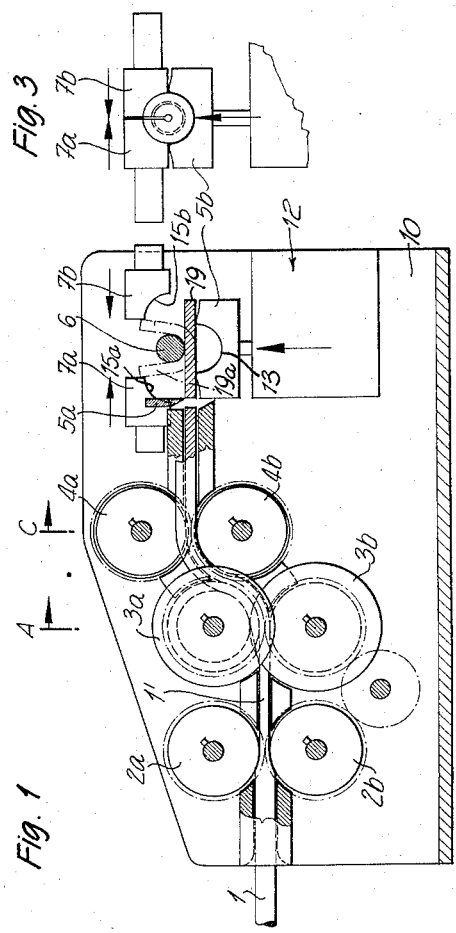
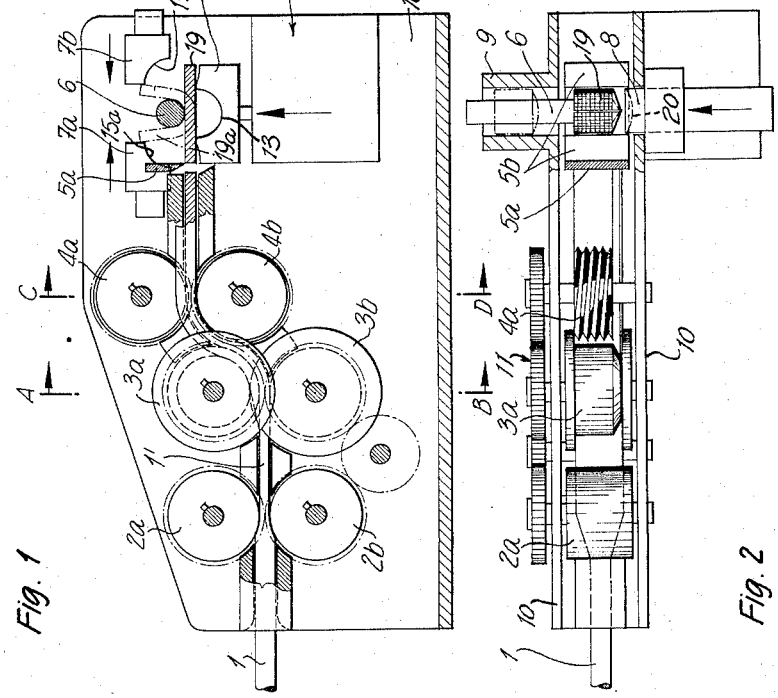
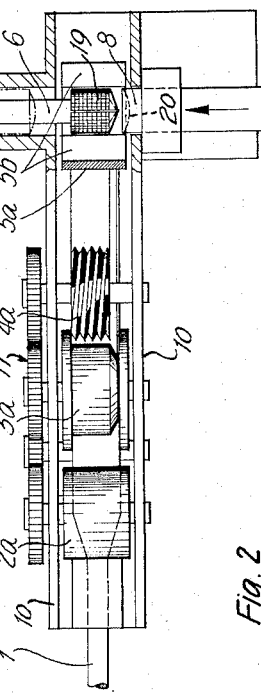
INVENTOR:
Ferenc Erdélyi,
BY Singer, Stern & Carlburg
Attorneys.

2,852,806

MEANS FOR MANUFACTURING SUBSTANTIALLY SLEEVE-SHAPED ARTICLES CLOSED AT ONE END AND PROVIDED WITH AN INTERNAL THREAD

Ferenc Erdélyi, Hamburg, Germany

Application October 28, 1953, Serial No. 388,875

Claims priority, application Germany September 25, 1953

3 Claims. (Cl. 18—1)

This invention relates to a means for manufacturing substantially sleeve-shaped articles closed at one end and provided with an internal thread. The outside of the sleeve is preferably knurled, or serrated.

In the operation of the inventive means, bar stock is passed between a pair of rollers and thereby formed into a band, or strip, an edge portion of which is then bent to one side by passing said strip between another pair of suitably profiled rollers, whereupon the side of the strip towards which the said edge portion is bent is provided with inclined parallel equidistantly spaced grooves by being passed between an additional pair of rollers and the strip is cut into pieces of suitable length which are bent around a transverse mandrel to form a sleeve with a continuous internal thread. The bent edge portion forms the closed end of the sleeve.

The inventive means comprises a device in which the described operation is carried out as a continuous procedure, and the articles thus manufactured are particularly suitable for being embedded in molded synthetic compositions, the closed end of the sleeve-shaped articles preventing said composition from entering the article during the molding process.

An embodiment of the invention is described below with reference to the accompanying drawing in which:

Fig. 1 shows a side elevation and partial section of a device according to the invention, Fig. 2 shows a plan view and partial section of said device, Fig. 3 shows a detail, and Figs. 4 and 5 show partial sectional views on the lines A—B and C—D in Fig. 1.

In the embodiment of the invention shown in the drawing, three pairs of rollers 2a, 2b; 3a, 3b; and 4a, 4b are mounted in a frame 10 on shafts which are operatively interconnected by means of gear wheels generally indicated at 11. The rollers may thus be driven by a common source (not shown) applied to any of the shafts.

At a distance from the rollers 4a, 4b a cutting device is disposed which comprises a stationary upper blade 5a with a sharp lower edge and a lower member 5b which is movable vertically to provide shearing action in cooperation with the stationary blade 5a. The means for moving the member 5b may be of any suitable kind and is indicated generally in the drawing at 12.

Above the member 5b a cylindrical mandrel 6 is mounted. Said mandrel 6 is parallel with the shafts of the rollers and has associated therewith means (not shown) for moving the mandrel axially in a calibrating ring 9 attached to or forming part of the frame 10. The member 5b is provided with a recess 13 in its upper side, said recess 13 being substantially semi-cylindrical with its axis parallel to the axis of the mandrel 6. At the opposite side of the frame 10 from the ring 9, a plunger 8 is mounted which is coaxial with the mandrel 6 and associated with means (not shown) for moving said plunger 8 longitudinally towards and from the mandrel 6.

Two die members 7a and 7b are mounted adjacent the mandrel 6, one at each side of said mandrel 6 and associated with means (not shown) for moving said die members 7a, 7b towards and away from each other. On the ends facing the mandrel 6 said die members 7a, 7b have cylindrical faces 15a, 15b with the axis parallel with the axis of the recess 13.

The roller 3a is provided with a circumferential groove 16 near one end of the roller, and the roller 3b has a circumferential flange 17 extending into the groove 16, as indicated in Fig. 4. The roller 4a is provided with a plurality of grooves 18 which are parallel with each other, equally spaced, and disposed in planes which are inclined in relation to the axis of the roller 4a. The roller 4b may be smooth or profiled as, for instance, serrated or knurled.

In operation, a round bar 1 is fed in between the rollers 2a and 2b from where it emerges as a flat strip 1'. Said strip 1' then passes between the rollers 3a and 3b emerging substantially in the shape indicated in Fig. 4, i. e. as a flat strip 1''' provided with an inclined flange 1'' at one longitudinal edge thereof. Between the rollers 4a and 4b the strip 1''' is provided with profiled surfaces in accordance with the profile configuration of said rollers, as indicated in Fig. 5.

As clearly shown in Fig. 3, the roller 4b, besides having its periphery adjacent to the roller 4a for cooperation with said roller 4a, is also adapted to cooperate with the rollers 3a so that the strip 1' is bent on the circumference of the roller 3a after it emerges from between the rollers 3a and 3b and before it is again bent in the opposite direction on the circumference of the roller 4b prior to entering between the rollers 4a and 4b.

The strip then passes under the stationary cutting blade 5a and when a predetermined length of the strip has passed said blade 5a, the member 5b is caused to move upwards, thereby cutting off the end piece 19 from the strip and, in its continued movement upwards, bending said end piece 19 around the mandrel 6 substantially into U-shape, as indicated in dotted lines at 19a. The die members 7a, 7b then move towards each other completing the bending of the end piece 19 into cylindrical shape, as indicated in Figs. 2 and 3. The members 5b, 7a and 7b are caused to return to their initial positions.

The plunger 8 which has a concave end, as at 20, is caused to move towards the bent end piece 19 thereby pushing said end piece 19 together with the mandrel 6 into the calibrating ring 9 where the mandrel 6 is caused to stop temporarily so as to enable the plunger 8 to exert a heavier pressure on the bottom of the end piece 19 formed by the flange 1''. The plunger 8 then ejects the end piece, or sleeve, 19 together with the mandrel 6 from the calibrating ring 9 whereupon the sleeve 19 may be removed from the mandrel 6 manually or by any other suitable means.

The length of the end piece 19 and the inclination of the grooves 18 in the roller 4a are so coordinated as to cause the formation in the sleeve 19 of a continuous internal thread.

The appended claims are intended to cover all legitimate modifications and variations of the described embodiment of the invention.

What I claim is this:

1. Means for manufacturing from bar stock a substantially sleeve-shaped internally threaded article having a closed end, comprising a frame, three pairs of rollers rotatably mounted in said frame, means operationally connecting said rollers to enable them to be driven from one and the same driving means, cutting means for severing pieces of predetermined length from said bar after its passage through said roller pairs in succession, means for bending each of said pieces into sleeve-shape, a calibrating ring, and means for ejecting said formed sleeve-shaped articles through said calibrating ring, the first pair of said rollers being adapted to flatten the bar stock into a strip of predetermined width and thickness, the second of said pairs of rollers being adapted to bend an edge portion of said strip to one side, the third of said pairs of rollers being adapted to impress in the side of said strip towards which said edge portion is bent a plurality of inclined parallel equidistantly spaced grooves to form a continuous internal thread therein after each of said pieces has been bent into sleeve-shape, said third pair of rollers being offset in relation to said second pair of rollers so as to force said strip to bend on the circumference of one roller in said second pair of rollers and then to curve back on the circumference of one of said third pair of rollers prior to passing between the two rollers in said third pair of rollers.

2. Means as set forth in claim 1, in which said cutting means comprises a stationary knife means and a movable knife means cooperating with said stationary knife means, said movable knife means forming part of said bending means and being adapted to cooperate with a mandrel to bend each of said cut pieces substantially into U-shape around said mandrel.

3. Means as set forth in claim 2, including relatively movable die members for completing the bending of said U-shaped strip into sleeve-shape, said ejecting means being adapted to eject said mandrel together with said sleeve-shaped piece, and said mandrel being adapted to be temporarily stopped during its ejection through said calibrating ring to form a counter member against which said bent edge portion is pressed by the ejecting means to form said closed end of the sleeve.

References Cited in the file of this patent

UNITED STATES PATENTS

| | | |
|---|---|---|
| 1,189,822 | House | July 4, 1916 |
| 1,226,949 | Clark | May 22, 1917 |
| 1,676,919 | Persons | July 10, 1928 |
| 2,121,170 | Konishi | June 21, 1938 |
| 2,137,797 | Berger | Nov. 22, 1938 |
| 2,334,233 | Wood | Nov. 16, 1943 |
| 2,350,772 | Klute et al. | June 6, 1944 |
| 2,533,227 | Delaney | Dec. 12, 1950 |
| 2,593,514 | Albrecht et al. | Apr. 22, 1952 |
| 2,607,935 | Archer | Aug. 26, 1952 |
| 2,608,717 | Kay | Sept. 2, 1952 |
| 2,662,246 | Klugh et al. | Dec. 15, 1953 |
| 2,674,764 | Eaby et al. | Apr. 13, 1954 |